United States Patent
Van Der Straaten

(10) Patent No.: US 12,484,588 B2
(45) Date of Patent: Dec. 2, 2025

(54) PARTIALLY TRANSPARENT DISPOSABLE PIPING BAG

(71) Applicant: One Way Plastics B.V., Oosterhout (NL)

(72) Inventor: Jan Cornelis Van Der Straaten, Bavel (NL)

(73) Assignee: ONE WAY PLASTICS B.V., Oosterhout (NL)

( * ) Notice: Subject to any disclaimer, the term of this patent is extended or adjusted under 35 U.S.C. 154(b) by 661 days.

(21) Appl. No.: 17/275,840

(22) PCT Filed: Sep. 16, 2019

(86) PCT No.: PCT/NL2019/050605
§ 371 (c)(1),
(2) Date: Mar. 12, 2021

(87) PCT Pub. No.: WO2020/055260
PCT Pub. Date: Mar. 19, 2020

(65) Prior Publication Data
US 2022/0053780 A1    Feb. 24, 2022

(30) Foreign Application Priority Data

Sep. 14, 2018  (NL) ..................................... 2021639
Sep. 14, 2018  (NL) ..................................... 2021641

(51) Int. Cl.
*A21C 15/00*   (2006.01)
*A23G 3/28*    (2006.01)

(52) U.S. Cl.
CPC .............. *A21C 15/005* (2013.01); *A23G 3/28* (2013.01)

(58) Field of Classification Search
CPC ....... A21C 15/005; A23G 3/28; A23G 3/0097
See application file for complete search history.

(56) References Cited

U.S. PATENT DOCUMENTS

| 5,110,530 A * | 5/1992 | Havens ................... B29C 48/12<br>425/132 |
| 2009/0188941 A1* | 7/2009 | Van Der Stratten ........................<br>A21C 15/005<br>222/107 |
| 2010/0272936 A1* | 10/2010 | White ..................... B32B 27/32<br>428/354 |

FOREIGN PATENT DOCUMENTS

| DE | 0 839 948 A2 * | 5/1998 | ............. B29C 67/00 |
| EP | 1495981 A2 * | 1/2005 | ............... B65D 3/06 |

(Continued)

OTHER PUBLICATIONS

EP0839948A2 ESpacenet Machine Translation (Year: 2023).*

(Continued)

*Primary Examiner* — Larry W Thrower
(74) *Attorney, Agent, or Firm* — MH2 Technology Law Group, LLP

(57) ABSTRACT

The present invention relates to a piping bag. More in particular, particular, the present invention relates to a piping bag for applying a foodstuff to a substrate, wherein the piping bag is of the disposable type. The present invention further relates to a co-extruded tubular foil from which such a piping bag can be obtained and to a method for providing artwork and/or text on such a piping bag. According to the invention, the outer layer and the inner layer of the tubular foil are transparent and the intermediate layer of the tubular foil is partially transparent through a distribution of pigment additives in the intermediate layer that is non-uniform in at least a direction perpendicular to the axial direction.

16 Claims, 6 Drawing Sheets

(56) References Cited

FOREIGN PATENT DOCUMENTS

| EP | 1598281    | 11/2005 |
|----|------------|---------|
| EP | 1978809    | 1/2012  |
| JP | 2009525043 | 7/2009  |
| JP | 3213615    | 11/2017 |
| WO | 2006069653 | 7/2006  |
| WO | 2016097834 | 6/2016  |
| WO | 2018160144 | 9/2018  |

OTHER PUBLICATIONS

EP-1495981-A2 ESpacenet Machine Translation (Year: 2023).*
JP3213615U Espacenet Machine Translation (Year: 2023).*
WO2006069653A1 Espacenet Machine Translation (Year: 2023).*

* cited by examiner

PARTIALLY TRANSPARENT DISPOSABLE PIPING BAG

The present invention relates to a piping bag. More in particular, the present invention relates to a piping bag for applying a foodstuff to a substrate, wherein the piping bag is of the disposable type. The present invention further relates to a co-extruded tubular foil from which such a piping bag can be obtained and to a method for providing artwork and/or text on such a piping bag.

The use of piping bags for applying foodstuffs to a substrate has been known for a long time. In the past, mainly cotton piping bags were used. These bags may be cleaned after use, although the process of cleaning can be both difficult and time consuming. Another type of piping bags, referred to hereinafter as disposable piping bags, is made from a different material, namely polymer materials. Typically, these piping bags are used only once or a few times before they are discarded.

EP 1978809 B1 discloses a co-extruded multilayer piping bag wherein at least one portion of the outer side of the bag comprises a rubber composition located to improve grip for a user of the piping bag during the application of the foodstuff to the substrate, wherein the rubber composition comprises a thermoplastic elastomer. This piping bag allows the user to maintain grip even under moist or fatty conditions, e.g. when applying whip cream or the like.

The abovementioned piping bag is provided on a roll. This roll comprises a tubular foil comprising an arrangement of identical foil blocks that are repeated in an axial direction of the tubular foil, each foil block comprising a welded seam that connects two opposite sides of the tubular foil thereby at least partially defining at least two piping bags. Furthermore, the tubular foil, and therefore the piping bag itself, has an opaque and green appearance due to the addition of pigment additives during the co-extrusion process of the tubular foil. These pigment additives result in a green color of the tubular foil. The addition of these additives is required to comply with food safety regulations. For example, to obtain a piping bag, it has to be separated from the remainder of the tubular foil. At that time, the dispensing end of the piping bag is still closed. A user has to cut the bottom end of the piping bag, the so-called tip region, to create a dispensing opening through which a dispensing nozzle may be arranged. A problem may however arise when the severed part is lost, particularly when it is lost in other foodstuff such as a cake or the like. If the piping bag is transparent, the severed part cannot easily be recognized. A danger therefore exists that the severed part will be lost causing health hazards for the end consumer as the severed part may end up in the final food product.

In addition to the abovementioned colored co-extruded piping bags, other co-extruded piping bags are known that are fully transparent but wherein the tip region is covered with ink to address the health hazards mentioned above. These piping bags offer the advantage that a user can see the contents of the piping bag as it is made of transparent material. However, a drawback of these piping bags is related to the ink that is applied to the tip region. Especially in fatty conditions, the ink may dissolve or may otherwise mix with the foodstuff causing inconvenience and/or health hazards for the end user.

WO 2018160144 A1 discloses a piping bag made from a co-extruded multi-layered tubular foil comprising an outer, an inner and an intermediate layer, wherein the intermediate layer may be provided with coloring agents. A drawback of this piping bag is that it is either colored, thereby allowing a user to quickly identify piping bag tips that may have mixed with foodstuff, or it is transparent, allowing the user to visually inspect the contents of the piping bag.

An object of the present invention is to provide a piping bag of which the user may inspect the inside but which still complies with modern day food safety requirements.

This object has been achieved with the co-extruded multilayer tubular foil as defined in claim 1 which comprises an arrangement of identical foil blocks that are repeated in an axial direction of the tubular foil, each foil block comprising a welded seam that connects two opposite sides of the tubular foil thereby at least partially defining at least two piping bags. According to the invention, the tubular foil comprises an outer layer, an inner layer, and an intermediate layer arranged in between the outer layer and the inner layer, wherein the outer layer and inner layer are transparent and the intermediate layer is partially transparent through a distribution of pigment additives in the intermediate layer that is non-uniform in at least a direction perpendicular to the axial direction.

The Applicant has found that a piping bag wherein pigment additives are only non-uniformly distributed in the intermediate layer can be more readily fabricated using co-extrusion than a piping bag wherein such additives are non-uniformly distributed in the outer and/or inner layer.

The abovementioned direction that is perpendicular to the axial direction may be a circumferential direction. For example, the tubular foil may display a different opacity along its circumference, wherein at least a part of the tubular foil is transparent to the extent that a user may inspect the contents of the piping bag during use. Moreover, the distribution of pigment additives in the intermediate layer may additionally be non-uniform in the axial direction.

Within the context of the invention, a layer is said to be transparent if a user can see through the layer for the purpose of inspecting the contents in the piping bag. In some embodiments, a transparent layer is a layer that is made using essentially transparent polymer materials. Such a layer is generally devoid from any pigment additives. Furthermore, the pigment additives of the present invention are generally applied in such a concentration that a user cannot see through the respective region in which the additives are used.

Each foil block may further comprise a transverse perforation line arranged perpendicular to the axial direction. Additionally or alternatively, the welded seam may extend obliquely across the foil block and may define, together with edges of the tubular foil, a tip region for each of the at least two piping bags. By applying the welded seam to the tubular foil, the foil becomes flattened. In such flattened state, opposite edges of the tubular foil, which extend along the axial direction, can be identified. Here, the welded seam preferably extends between these opposite edges of the tubular foil. The welded seam connects opposite sides of the tubular foil as this seam defines an outer edge of the piping bags. Furthermore, the welded seam may comprise two welded sub-seams in between which a perforation line is arranged. Such welded seam allows the separation of two piping bags that are located in the same foil block along this perforation line while at the same time maintaining the airtight edge definition of both piping bags by means of the two welded sub-seams.

The transverse perforation line or other weakening of the foil allows two adjacently arranged piping bags in different foil blocks of the foil to be easily separated.

The pigment additives in the intermediate layer are dyes, preferably dyes chosen from the group consisting of natural dyes. Additionally or alternatively, the pigment additives in the intermediate layer are chosen from the group consisting of natural pigments.

Typically, a foil block defines two piping bags. As an example, a foil block may start with a transverse perforation line followed by an angled welded seam that starts at one edge of the tubular foil offset from the transverse perforation line and ends at the opposite edge of the tubular foil offset from the transverse perforation line of the adjacent foil block.

The intermediate layer comprises a first region and a second region, wherein the first region and second region are mutually connected and adjacently arranged in a direction parallel to a surface of the tubular foil. This direction is preferably the abovementioned circumferential direction. In addition, the second region of the intermediate layer is transparent and the first region of the intermediate layer comprises at least a part of the pigment additives to provide a colored strip that extends in the axial direction, wherein the colored strip at least partially colors the tip region.

Using a first and second region in which pigment additives are and are not present, respectively, offers the advantage of only applying the coloring where it is needed, namely the tip region, thereby saving costs and offering the user the maximum amount of transparency that is feasibly without jeopardizing food safety.

According to the invention, the piping bag further comprises a further first region having one or more pigment additives, and a further second transparent region, wherein the first region and the further first region are each arranged between the second region and the further second region. In this embodiment, at least four different regions can be identified. In a particular embodiment, four different regions are used wherein the first regions are arranged near the edges of the tubular foil to color the tip regions of both piping bags. The arrangement of the first and second regions is preferably symmetric. According to the invention, the second region and the further second region are preferably aligned with each other to form a transparent window to provide a view through the tubular foil.

Various polymer materials can be used for realizing the inner, outer, and intermediate layers. Preferably, the inner layer comprises a polyolefin, such as low density polyethylene (LDPE). The outer layer preferably comprises a rubber-containing composition incorporating a thermoplastic elastomer located to improve grip for a user of a piping bag obtained from said tubular foil during the application of foodstuff to a substrate. The first and/or second region may comprise a polyolefin, such as low density polyethylene (LDPE). This composition of layers provides the advantages of having an improved grip while still allowing a user to inspect the contents of the piping bag. The thicknesses of the inner layer and outer layer may each lie within a range from 20 to 50 microns, and a thickness of the intermediate layer may lie within a range from 10 to 30 microns.

The first region, the further first region, the second region, and/or the further second region may comprise pigment particles for laser marking, such as mica particles, preferably mica platelets covered by $TiO_2$, $SnO_2$, or $SbO_2$. When these particles are illuminated with a suitable focused light source, such as a laser, the incident light is absorbed causing the temperature of the pigment particles to increase rapidly. Consequently, the polymer material surrounding the pigment particles is carbonized. For example, the polymer material turns black specifically at the point targeted by the laser. Examples of pigment particles are Iriotec® 8000 series laser pigments, or the ACTELAR® laser master batch.

By adding the pigment particles for laser marking it becomes possible to obtain a piping bag onto which artwork and/or text can be arranged. More importantly, compared to prior art solutions wherein artwork and/or text is provided on the piping bag by means of an ink-based and/or transfer printing process, the overall thickness of the roll of piping bags can be kept uniform along the longitudinal direction of the roll. Such uniformity facilitates automated handling of the roll as its motion during rolling is well defined. In an ink-based and/or transfer printing process, the added ink adds locally to the overall thickness of the roll causing non-uniformity in thickness along the longitudinal direction of the roll. During automated handling, the roll may, during rolling, deviate from a desired straight path, thereby complicating further handling steps, such as packaging.

Preferably, thicknesses of the first region, the further first region, the second region, and the further second region are identical. Additionally or alternatively, apart from the plurality of welded seams and perforation lines, a cross section of the intermediate layer is constant along the axial direction. However, the present invention does not exclude embodiments wherein the colored strip, or the transparent region, is curved along the axial direction of the tubular foil.

According to a second aspect, the invention provides a piping bag that has been obtained by separating the tubular foil as defined above along the welded seam and perforation line.

According to a third aspect, the invention provides a method for providing a co-extruded multilayer piping bag with artwork and/or text, comprising providing the foil as defined above in which pigment particles for laser marking are provided, providing a source of focused light, such as a laser, and patterning the foil using the focused light for forming the artwork and/or text. Preferably, all the piping bags defined on the tubular foil are patterned before separating a piping bag from the remainder of the tubular foil. As an advantageous example, a scale may be patterned into the foil for allowing a user to determine a volume of contents present in the piping bag. Such scale could for instance be expressed in any suitable metric such as liter or milliliter. Additionally or alternatively, the scale may be indicative of the weight of a specific content when held in the piping bag. The scale is preferably provided in the transparent second region or transparent further second region.

According to a fourth aspect, the invention provides a piping bag obtained by applying the method as described above.

Next, the invention will be described in more detail referring to the appended figures, wherein.

Figure 1:
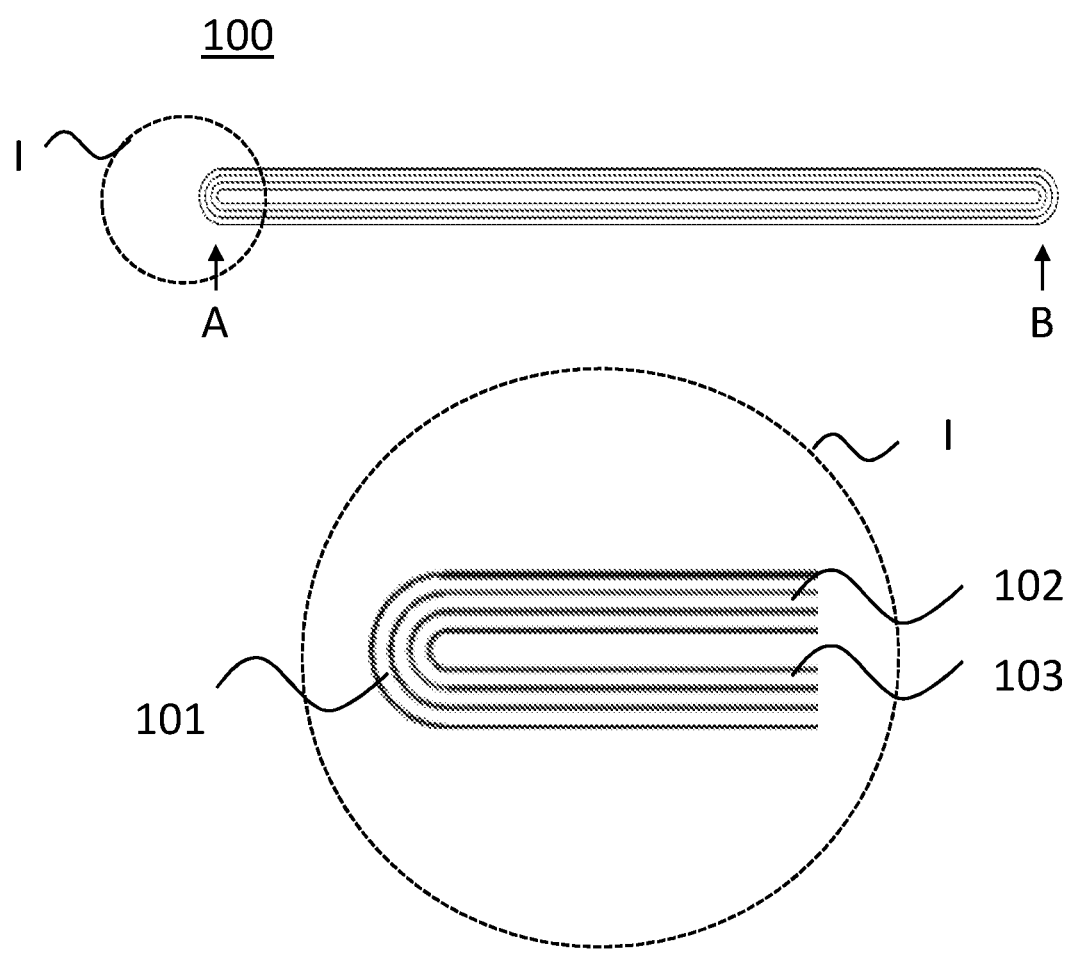
FIG. 1 illustrates a cross section of a first example of a known tubular foil for piping bags.
Figure 2:
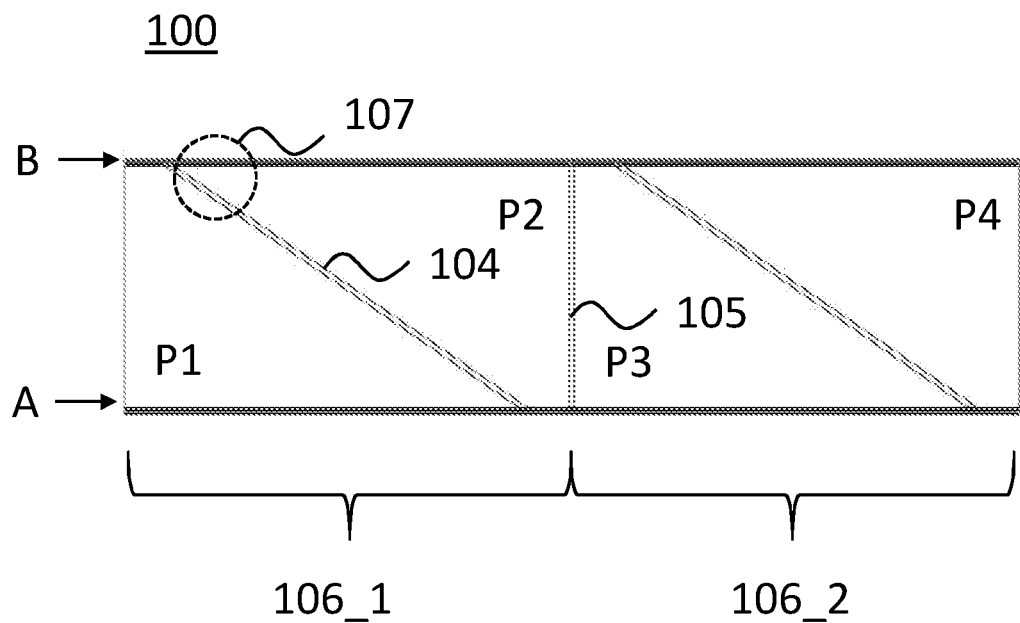
FIG. 2 illustrates a top view of the tubular foil of FIG. 1.

FIG. 1 illustrates a cross section of an example of a known tubular foil 100 for piping bags and FIG. 2 illustrates a corresponding top view. Known tubular foil 100 comprises an outer layer 101, an intermediate layer 102, and an inner layer 103, which are all transparent. Due to angled welded seam 104, tubular foil 100 will attain a flattened shape allowing the identification of edges A and B.

FIG. 2 shows how angled welded seam 104 and transverse perforation line 105 define piping bags P1-P4. More in particular, identical foil blocks 106_1 and 106_2 can identified that are repeated in the axial or longitudinal direction of the foil. Angled welded seam 104 extends obliquely between edges A and B. This seam connects the opposite sides of the tubular foil to each other thereby flattening tubular foil 100. Transverse perforation line 105 extends between edges A and B in a direction that is perpendicular to the axial or longitudinal direction. Typically, this perforation line allows easy separation of adjacent piping bags P2 and P3.

Piping bag P2 can be removed from tubular foil by cutting, or tearing along seam 104, and perforation line 105. A tip region 107 of piping bag P2 can be identified. This region is cut prior to use of piping bag P2. In addition, an opening is formed at the position of perforation line 105. Through this opening, foodstuff can be introduced in piping bag P2.

In the known piping bag of FIGS. 1-2, the tip regions of the piping bags are covered with ink (not shown) to allow a severed tip region to be easily identified. In other known piping bags, the entire piping bag is colored.

Figure 3:
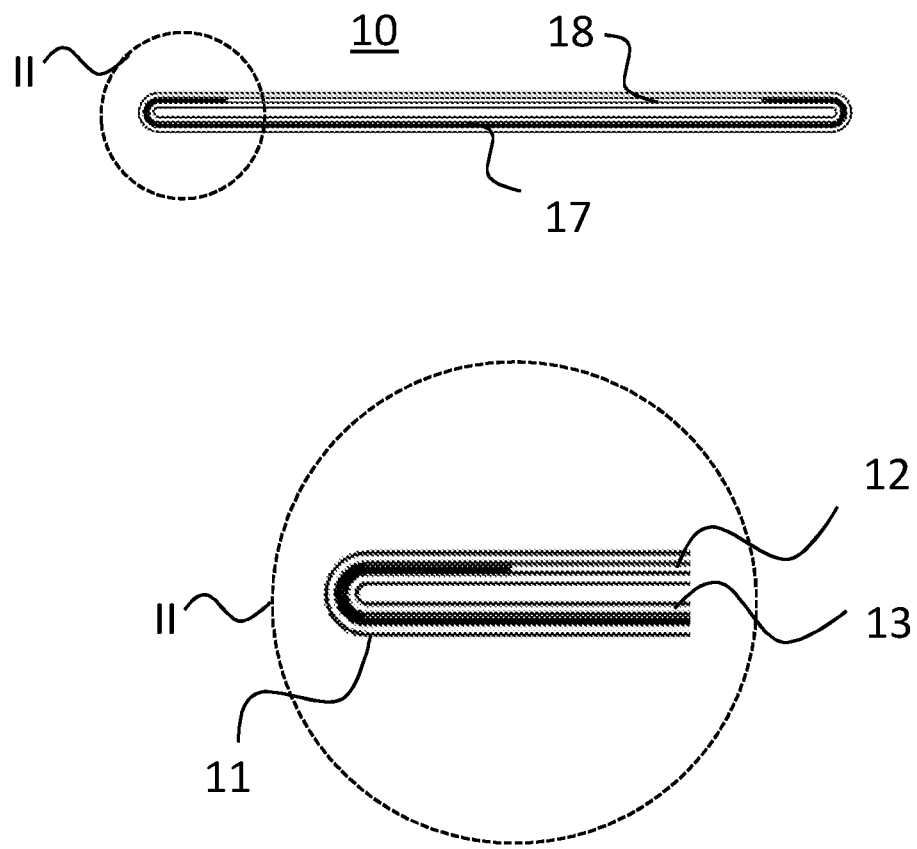
FIG. 3 illustrates a cross section of a first embodiment of a tubular foil for piping bags according to the invention.
Figure 4:
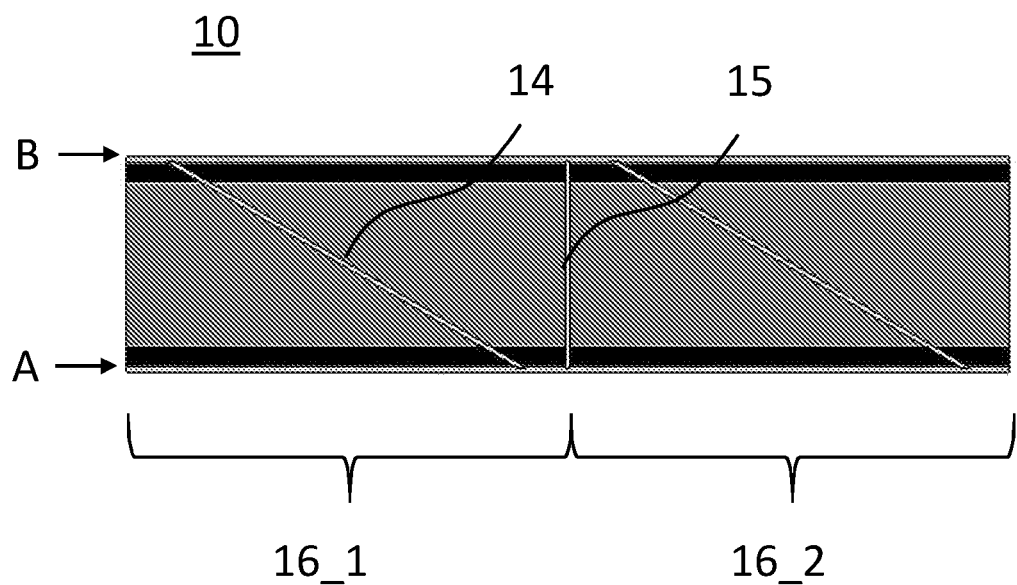
FIG. 4 illustrates a top view of the tubular foil of FIG. 3.

FIG. 3 illustrates a cross section of a first embodiment of a tubular foil 10 for piping bags according to the invention. The corresponding top view is illustrated in FIG. 4. In this embodiment, tubular foil 10 comprises an outer layer 11, an intermediate layer 12, and an inner layer 13. Within intermediate layer 12, a first colored region 17 and a second transparent region 18 can be identified. Here, region 17 extends over edges A and B such that the tip region is colored by first region 17. Moreover, the arrangement of first region 17 and second region 18 is symmetric relative to a central axis of tubular foil 10. Similar to the foil in FIG. 2, identical foil blocks 16_1, 16_2 can be identified that are repeated in the axial or longitudinal direction as well as transverse perforation lines 15 and angled welded seams 14.

Figure 5:
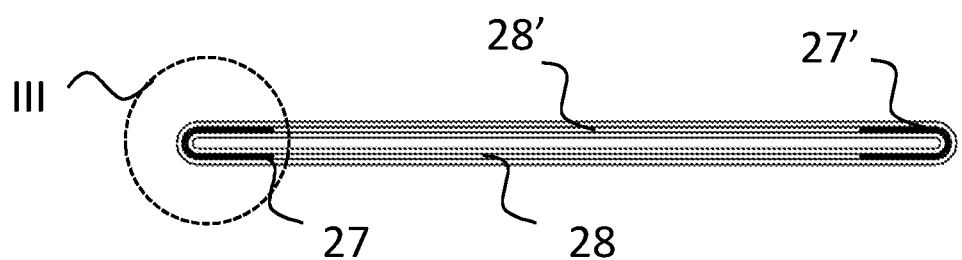
FIG. 5 illustrates a cross section of a second embodiment of a tubular foil for piping bags according to the invention.
Figure 5:
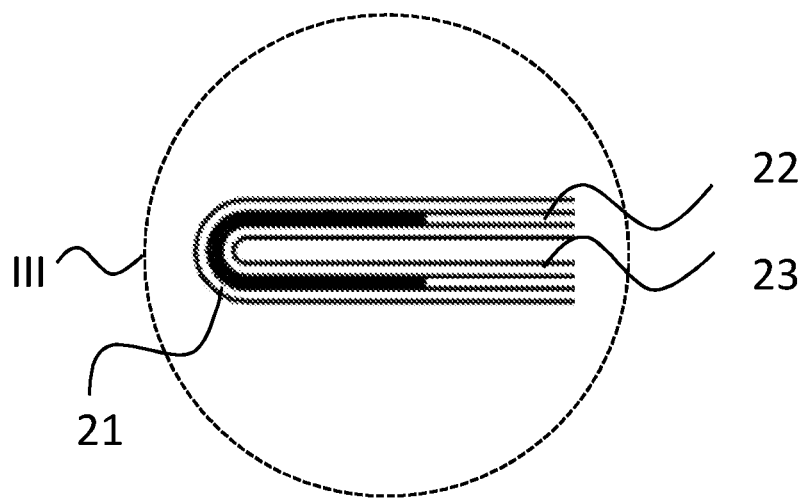
Figure 6:
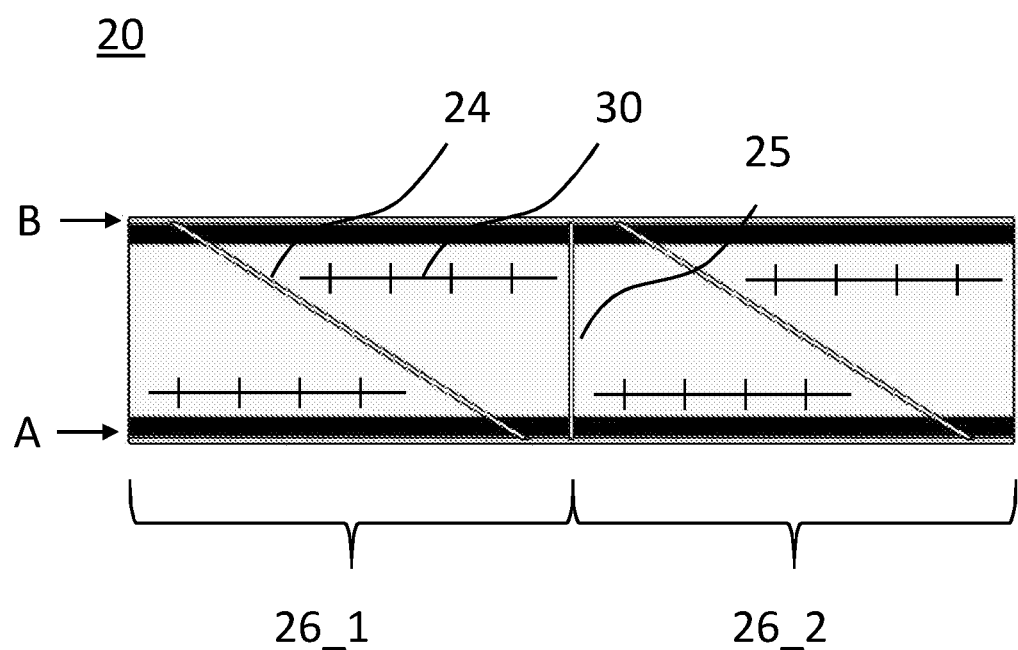
FIG. 6 illustrates a top view of the tubular foil of FIG. 5.

In the FIG. 3 embodiment, a transparent window is formed in the piping bags as a result of transparent second region 18. In this embodiment, the size of second region 18 is smaller than that of first region 17. In the second embodiment of a tubular foil 20 for piping bags according to the invention, also comprising an outer layer 21, an intermediate layer 22, and an outer layer 23 as shown in FIGS. 5 and 6, the transparent regions of the piping bags are larger than the opaque regions. This is made possible, because tubular foil 20 now comprises a transparent second region 28 and a transparent further second region 28', which regions are connected using a colored first region 27 and a colored further first region 27'. In this embodiment, the coloring is only applied to at least partially cover the tip region. Similar to the foil in FIG. 2, identical foil blocks 26_1, 26_2 can be identified that are repeated in the axial or longitudinal direction as well as transverse perforation lines 25 and angled welded seams 24.

Pigment particles for laser marking could be applied in the FIG. 3 or 5 embodiments in any region of intermediate layer 12, 22. The distribution of these pigment particles need not correspond to the distribution of the pigment additives used for coloring the tip region. However, the pigment particles for laser marking could equally be applied only in the first region or further first region. Such particles may also be applied in case the pigment additives are not present in the intermediate layer. In this latter case, which is outside the scope of the present as defined by the appended claims, the first region, the further first region, the second region, and the further second region are defined by the presence or absence of pigment particles for laser marking.

As an example, pigment particles may be distributed in transparent second region 18, 28 or the further transparent second region 28'. Tubular foil 10, 20 may have been subjected to a laser marking process in which a scale 30 is patterned inside at least one of (further) second regions 18, 28, 28'. Such scale, illustrated in FIG. 6, could be configured to indicate a measure of a volume of contents arranged inside the piping bag. Using this scale, a user of the piping bag may easily determine a quantity of foodstuff still present in the piping bag and/or may use the scale to precisely dispense a predefined amount of foodstuff in the piping bag.

To manufacture tubular foil 10, 20, a co-extrusion process is used. For the formation of intermediate layer 12, 22, at least two distinct flows of materials are used, e.g. one flow with pigment additives, and one flow without or with substantially less additives. Details on how to adapt the die and the co-extrusion process for the formation of different regions inside a layer are known for example from U.S. Pat. No. 5,110,530 A.

Inner layer 13, 23 and intermediate layer 12, 22 of tubular foils 10, 20 may comprise a polyolefin, such as low density polyethylene (LDPE). Outer layer 11, 21 of tubular foils 10, 20 may comprise a rubber-containing composition incorporating a thermoplastic elastomer located to improve grip for a user of a piping bag during the application of foodstuff to a substrate. Here, the rubber-containing composition may be identical to the rubber composition described in EP 1978809 B1. Thicknesses of the inner layer and outer layer each lie within a range from 20 to 50 microns, and a thickness of the intermediate layer lies within a range from 10 to 30 microns.

The thermoplastic elastomer of the rubber composition is particularly chosen from the group of styrene-based elastomers, such as styrene-ethylene/butylene-styrene (SEBS) or styrene-ethylene/propylene-styrene and/or styrene butylene styrene (SBS). The elastomer can also be chosen from the group of thermoplastic vulcanized or non-vulcanized material (TPV/TPO) and comparable block copolymers. SEBS in particular can be applied. The rubber compositions particularly comprise, in addition to the rubber, one or a number of polyolefins, in particular polypropylene.

The rubber composition preferably comprises 20-90% rubber ((apolar) thermoplastic elastomer) and 80-10% other materials such as polyolefins, in particular polyethylene and/or polypropylene, white oils, softeners and the like. In a particular composition the rubber compound is formed by 45-85%, in particular 60-80% rubber and 55-15%, in particular 40-20% other materials. The Shore A hardness is preferably 55-75. Compositions for the rubber compound are described for instance in WO 95/03984 and WO 93/22221.

The Applicant has found that when using a piping bag comprising the abovementioned rubber composition in outer layer 11, 21, in combination with an ink-based and/or transfer printing process to add artwork and/or text onto the piping bag, a reduction in grip at the positions where the ink is applied can be observed. According to an aspect of the invention, this reduction in grip can be prevented by applying the pigment particles used for laser marking in intermediate layer 12, 22 and to use laser marking for adding the artwork and/or text.

In the description above, various embodiments have been described to illustrate the inventive concept of the present invention. However, a skilled person will readily understand that the present invention is not limited to these embodi-

The invention claimed is:

1. A co-extruded multilayer tubular foil comprising an arrangement of identical foil blocks that are repeated in an axial direction of the tubular foil, each foil block comprising a welded seam that connects two opposite sides of the tubular foil thereby at least partially defining a first and second piping bag, said tubular foil comprising an outer layer, an inner layer, and an intermediate layer arranged in between the outer layer and the inner layer,
   wherein the outer layer and the inner layer are transparent and the intermediate layer is partially transparent through a distribution of pigment additives in the intermediate layer that is non-uniform at least in a direction perpendicular to the axial direction of the tubular foil,
   wherein each foil block further comprises a transverse perforation line arranged perpendicular to said axial direction, and wherein the welded seam extends obliquely across the foil block and defines, together with edges of the tubular foil, a tip region for each of said first and second piping bag,
   wherein the intermediate layer comprises a first region and a second region, wherein the first region and second region are mutually and directly connected and adjacently arranged in a direction parallel to a surface of the tubular foil,
   wherein the second region of the intermediate layer is transparent and wherein the first region of the intermediate layer comprises a part of said Patent
   pigment additives to provide a colored strip that extends in the axial direction, said colored strip coloring at least the tip region for the first or second piping bag,
   wherein the intermediate layer further comprises a further first region and a further second region, the further first region having a remainder of said pigment additives to provide a further colored strip that extends in the axial direction, said further colored strip coloring at least the tip region for an other of said first or second piping bag, wherein the further second region of the intermediate layer is transparent,
   wherein the first region and the further second region are mutually directly connected and adjacently arranged in a direction parallel to a surface of the tubular foil,
   wherein the further first region and the further second region are mutually and directly connected and adjacently arranged in a direction parallel to a surface of the tubular foil,
   wherein the second region and further first region are mutually directly connected and adjacently arranged in a direction parallel to a surface of the tubular foil,
   wherein the second region and the further second region are aligned with each other to form a transparent window to provide a view through the tubular foil,
   wherein the second region and further second region are larger than the first region and further first region,
   wherein the inner layer comprises a polyolefin,
   wherein the outer layer comprises a rubber-containing composition incorporating a thermoplastic elastomer,
   wherein the first region, further first region, second region, and further second region comprise a polyolefin,
   wherein the intermediate layer is made from transparent polymer material, and
   wherein the second region and the further second region are devoid from any pigment additives.

2. The tubular foil according to claim 1, wherein thicknesses of the inner layer and outer layer each lies within a range from 20 to 50 microns, and wherein a thickness of the intermediate layer lies within a range from 10 to 30 microns.

3. The tubular foil according to claim 1, wherein the first region, the further first region, the second region, and/or the further second region comprises pigment particles for laser marking.

4. The tubular foil according to claim 1, wherein thicknesses of the first region, the further first region, the second region, and the further second region are identical.

5. The tubular foil of claim 1, wherein, apart from the plurality of welded seams and perforation lines, a cross section of the intermediate layer is constant along the axial direction.

6. The tubular foil of claim 1, wherein the welded seam extends between opposite edges of the tubular foil.

7. The tubular foil of claim 1, wherein the pigment additives in the intermediate layer are dyes chosen from a group consisting of natural dyes.

8. The tubular foil of claim 1, wherein the pigment additives in the intermediate layer are chosen from a group consisting of natural pigments.

9. A piping bag obtained by separating the tubular foil as defined in claim 1 along the welded seam and perforation line.

10. A method for providing a co-extruded multilayer piping bag with artwork and/or text, comprising:
    providing the foil as defined in claim 3;
    providing a source of focused light; and
    patterning the foil using the focused light for forming said artwork and/or text.

11. The method of claim 10, wherein all the piping bags defined on the tubular foil are patterned before separating a piping bag from the remainder of the tubular foil.

12. The method of claim 10, wherein a scale is patterned into the foil for allowing a user to determine a volume of foodstuff present in the piping bag, wherein the scale is provided in the transparent second region or transparent further second region.

13. A piping bag obtained by applying the method of claim 10.

14. The tubular foil of claim 1, wherein the polyolefin in the inner layer and/or the polyolefin in the first region, further first region, second region, and further second region is a low density polyethylene (LDPE).

15. The tubular foil of claim 3, wherein the pigment particles for marking are mica particles.

16. The tubular foil of claim 15, wherein the mica particles are covered by $TiO_2$, $SnO_2$, or $SbO_2$.

* * * * *

UNITED STATES PATENT AND TRADEMARK OFFICE
CERTIFICATE OF CORRECTION

PATENT NO. : 12,484,588 B2  
APPLICATION NO. : 17/275840  
DATED : December 2, 2025  
INVENTOR(S) : Jan Cornelis Van Der Straaten Page 1 of 1

It is certified that error appears in the above-identified patent and that said Letters Patent is hereby corrected as shown below:

On the Title Page

In item (57) the Abstract, Line 2: "More in particular, particular," should be -- More in particular, --.

Signed and Sealed this  
Twentieth Day of January, 2026

John A. Squires  
*Director of the United States Patent and Trademark Office*